Figure 1:
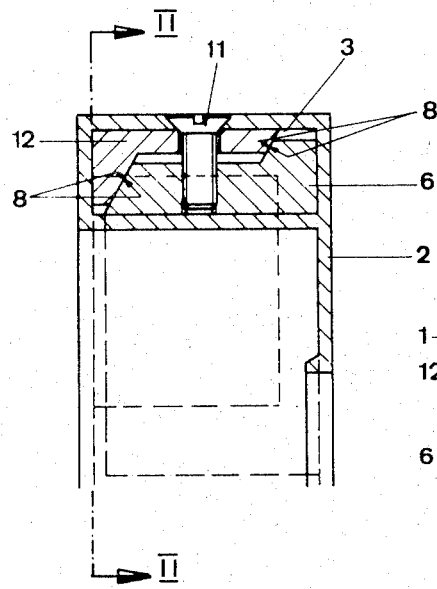

United States Patent [19]
Schneider

[11] 3,822,101
[45] July 2, 1974

[54] RELEASABLE CORNER CONNECTION DEVICE FOR HOLLOW SECTIONS

[75] Inventor: Jean-Pierre Schneider, Schaffhausen, Switzerland

[73] Assignee: Swiss Aluminium Ltd., Chippis, Switzerland

[22] Filed: Mar. 22, 1972

[21] Appl. No.: 242,875

[30] Foreign Application Priority Data
Mar. 23, 1971 Switzerland.................... 4197/71

[52] U.S. Cl................ 403/295, 52/758 H, 403/297
[51] Int. Cl.............................................. F16b 1/00
[58] Field of Search...... 287/189, 36 H, 54 A, 54 C; 52/475, 656, 758 H; 160/381; 285/397, 421; 403/295, 297

[56] References Cited
UNITED STATES PATENTS
| | | | |
|---|---|---|---|
| 3,317,227 | 5/1967 | Nijhuis............................. | 52/656 X |
| 3,434,749 | 3/1969 | Meyer............................. | 287/189.36 H |
| 3,484,830 | 12/1969 | Wagner et al..................... | 285/397 |
| 3,485,519 | 12/1969 | Chiu................................ | 52/475 |
| 3,514,135 | 5/1970 | Cooper........................... | 285/397 |

FOREIGN PATENTS OR APPLICATIONS
1,460,477 10/1966 France................. 287/189.36 H

*Primary Examiner*—Dave W. Arola
*Attorney, Agent, or Firm*—Ernest F. Marmorek

[57] ABSTRACT

The disclosure is concerned with a corner jointing device for mitred hollow sections which have to be assembled into window or door frames. The device comprises an angle piece and at least one tightening piece which both have corresponding wedge surfaces running parallel to the longitudinal axis of the frame members and at an acute angle to the transverse axis of the respective frame members, and at least one screw inserted in the direction of a transverse axis of the respective frame member. The tightening of the screw, as a consequence of the wedge surfaces, presses the angle piece and the tightening piece against at least three walls of the frame members cavity.

18 Claims, 14 Drawing Figures

PATENTED JUL 2 1974    3,822,101

SHEET 2 OF 4

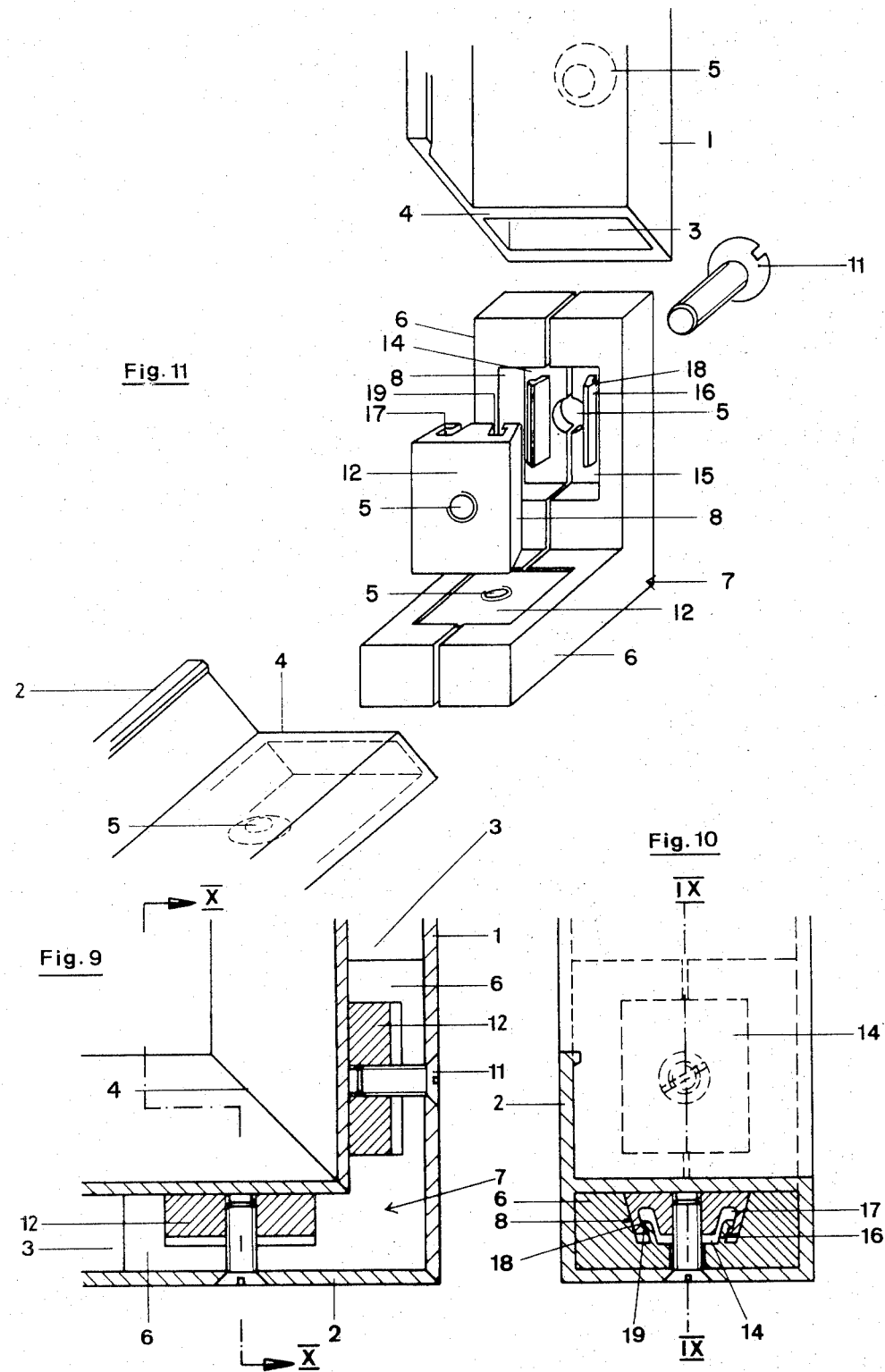

3,822,101

RELEASABLE CORNER CONNECTION DEVICE FOR HOLLOW SECTIONS

The invention relates to a releasable corner connection device for hollow sections with preferably rectangular cavity cross section, meeting at an angle and mitred at their ends, especially for window or door frames, composed of an angle piece, which engages with one leg each in the cavity of each frame section, and at least one tightening piece, while the frame section, the angle piece and the tightening piece are held together by wedging action produced by screwing.

In the known corner connections of this kind, the tightening pieces and screws are usually so arranged that the screw tension and thus the wedging action acts exclusively in the direction of the longitudinal axis of the frame section. The load-transmitting connection between the section and the angle piece and/or tightening piece is thus maintained only by the friction of the parts. For this reason it has many times been proposed to additionally glue the inner sides of the section's cavity walls to the adjacent surfaces of the angle piece and/or tightening piece, for experience showed that the frictional resistance alone is not sufficient. It is in addition further recommended to also glue the mitred surfaces as well, on the one hand to strengthen the connection of the frame sections, but on the other hand also to achieve a truly tight mitre joint.

If in such connection devices the parts are not very accurately worked and fitted to one another, it can easily happen that the wedge only presses on the section cavity wall at one point, directly, or indirectly through the angle piece, and this can have the consequence that the section wall is bulged out. A preparation of the parts with such close tolerances that such developments cannot occur is expensive and uneconomical.

Furthermore in all circumstances openings must be provided in the outer walls of the sections for the tightening of the screws, and these remain open. Through these openings, dirt and moisture can penetrate into the interior of the section and there cause damage by corrosion.

Moreover in these solutions, when assembling the frame corner, the location of the screw slots deep in the interior of the section cavity is a tricky and time consuming job, which makes the assembly of the frame more difficult and more expensive. In addition gluing operations are additional working steps giving rise to costs, which should be avoided.

The object of the present invention is therefore to produce a corner connection device, in which the parts, which must be operated during assembly and disassembly (e.g. for repairs), that is to say particularly the screws, are easily accessible, in which no unclosed openings occur in the section walls, and which enables the advantages of wedging action to be properly employed, in which, however, the transmission of forces is not performed only by frictional resistance. It is also desired, that the device fills as fully as possible the section cavity cross section, while the device should exert a force upon at least two opposite section walls; only then are the sections firmly connected together without clearance, and variations in measurement (tolerances) which may be present are rendered unimportant. In addition the mitred surfaces of the sections should be effectively pressed against one another, so that a tight joint results.

The solution has been found by the present invention, which is characterised in that the wedge surfaces of the angle piece and likewise of the tightening piece extend parallel to the longitudinal axis of the associated section, and make an acute angle with the transverse axis of the latter, and that each screw is inserted in the direction of a transverse axis of the associated section.

Figure 2:
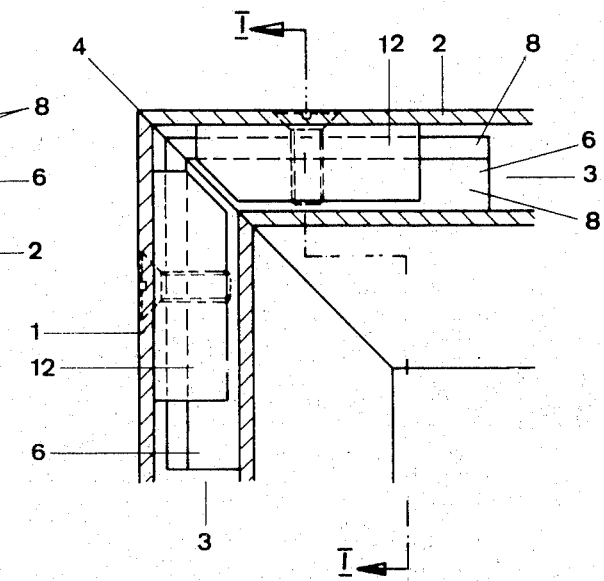

Below the invention will be explained by way of examples, with reference to the accompanying drawings. These show:

FIGS. 1 and 2 is a first constructional example,

FIG. 1 being a cross section on the line I—I in FIG. 2 and

FIG. 2 is a longitudinal section of the line II—II in FIG. 1.

Figure 3:
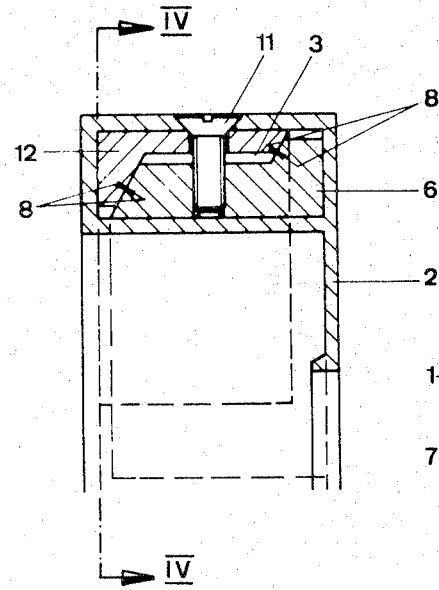
Figure 4:
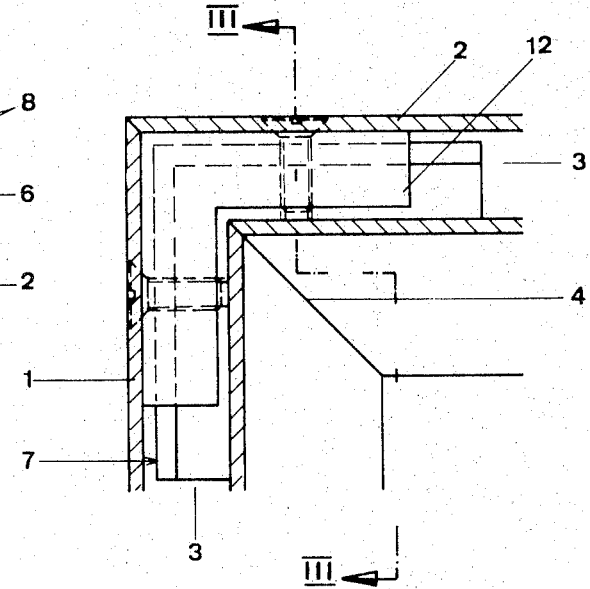

FIGS. 3 and 4 a second constructional example,

FIG. 3 being a cross section on the line III—III in FIG. 4 and

FIG. 4 a longitudinal section on the line IV—IV in FIG. 3.

Figure 5:
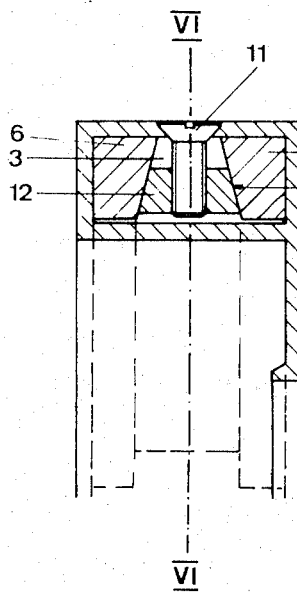
Figure 6:
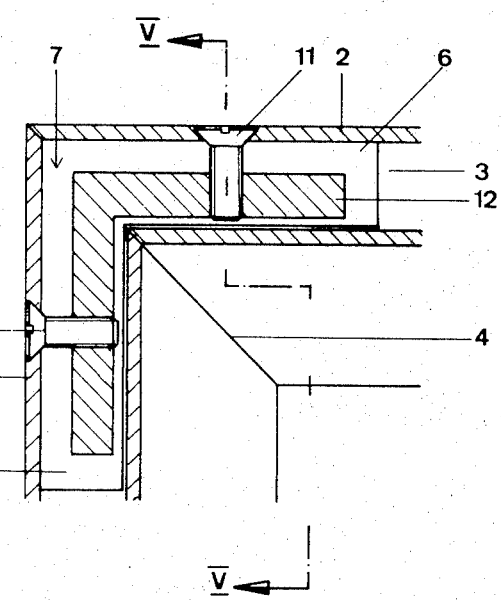

FIGS. 5 and 6 a third constructional example,

FIG. 5 being a cross section on the line V—V in FIG. 6 and

FIG. 6 a longitudinal section on the line VI—VI in FIG. 5.

Figure 7:
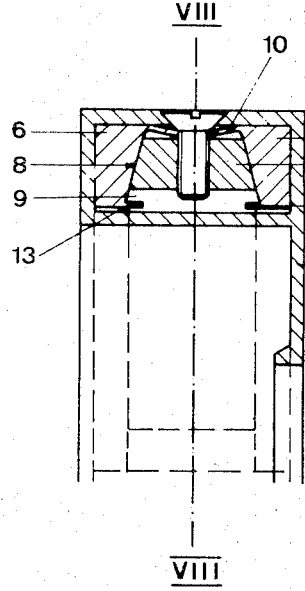
Figure 8:
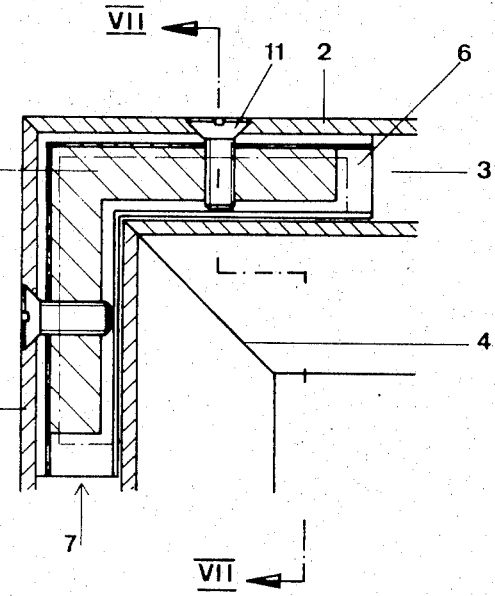

FIGS. 7 and 8 a fourth constructional example,

FIG. 7 again being in cross section on the line VIII—VIII in FIG. 8 and

FIG. 8 a longitudinal section on the line VIII—VIII in FIG. 7.

FIGS. 9 to 11 a fifth constructional example,

FIG. 9 a longitudinal section on the line IX—IX in FIG. 10

FIG. 10 a cross section on the line X—X in FIG. 9 and

FIG. 11 an exploded illustration of the parts, in which in the horizontal leg of the angle piece the tightening piece has already been inserted, while in the vertically extending leg of the angle piece the tightening piece and screw are shown in their position before insertion.

Figure 12:
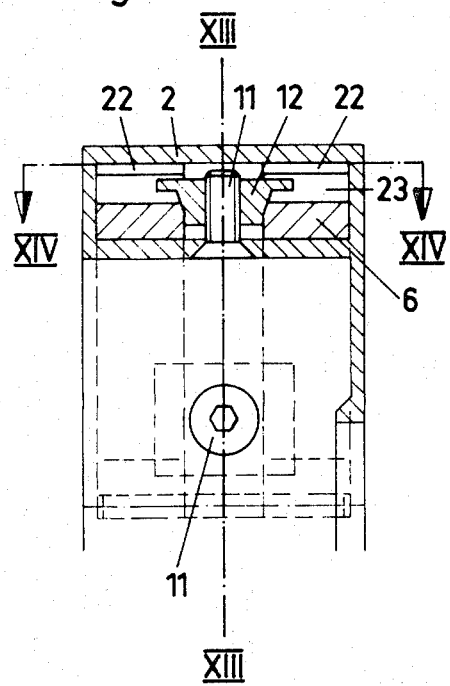
Figure 13:
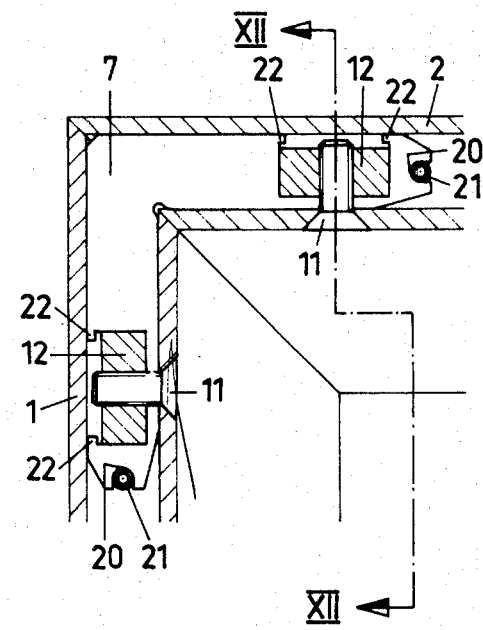
Figure 14:
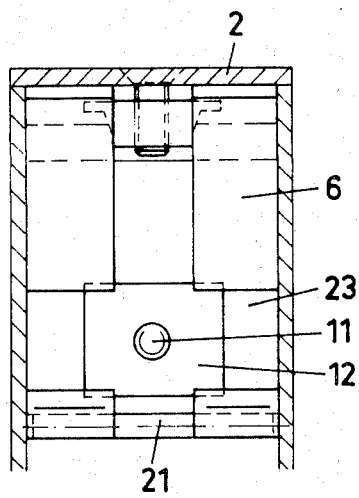

FIGS. 12 to 14 a further constructional form.

FIG. 12 being a longitudinal section on the line XII—XII in FIG. 13

FIG. 13 a cross section on the line XIII—XIII in FIG. 12

FIG. 14 a plan on the line XIV—XIV in FIG. 12.

In all the Figures the pair of sections which are to be connected together into a frame corner are indicated at 1 and 2. These sections preferably consist of metal, especially an aluminium alloy. They can however be made of a plastics material. In their shape they are hollow sections, the cavity 3 of which preferably has a rectangular cross section. In the interior of this cavity no projections, ribs, recesses or the like are necessary. The cross section of the frame member, can thus in this respect be as simple as possible with absolutely smooth inner walls, and this has favourable effect on the manufacture of the strips and on the costs. The only operation which has to be carried out on the frame sections is the cutting to the desired length, the provision of the mitre cuts 4 at each end, and the boring of a screw hole 5 in the neighbourhood of each end.

In the cavities 3 of the sections 1, 2 there is inserted in each case a leg 6 of the angle piece 7. This angle piece may be of metal, e.g. of aluminium, or of a suitable plastics material. Especially the construction according to FIGS. 7 and 8 is best carried out with a plastics angle piece.

Each angle piece leg 6 has at least one wedge surface 8. These wedge surfaces extend parallel to the longitudinal axis of the corresponding angle piece leg and the associated frame section. They make an acute angle with each of the transverse axes of the section cavity. There may be a single wedge surface 8 on each angle piece leg, but there may as well be two or more such surfaces present.

In the construction according to FIGS. 1 to 4, each angle piece leg 6 has two wedge surfaces 8. These are directed parallel to one another, and are arranged stepwise on the angle piece as seen in cross section.

In the construction according to FIGS. 7 and 8 the angle piece 7 has along the longitudinal axis of its leg 6 a deep groove 9 which is open towards the inner side of the frame, the side walls of which form the wedge surfaces 8, which diverge from one another towards the open side of the groove. The bottom 10 of the groove 9 is thin in cross section and convex towards the interior of the groove. Thus it is possible that if, by tightening the screw 11, the tightening piece 12 is pressed into the groove 9, the two halves of the angle piece connected together by the bottom 10 can yield away form one another, in the direction of the transverse axis of the cavity 3, while the convex bottom 10 of the groove is more or less stretched. In order to make this possible, the angle piece especially in this construction is advantageously made from a resilient plastics material.

At the same time in addition it is convenient to arrange short oppositely directed flanges 13 at the open edges of the groove 9. By this construction the entire device, with the exception of the screws, can be held in store as an interconnected assembly, delivered and installed. The two side parts of the angle piece can, thanks to the resilient properties of the material, bend away from one another and the tightening piece be inserted into the groove. Then the side pieces close in on the tightening piece, and the short flanges 13 prevent the tightening piece falling out of the groove.

In the constructions according to FIGS. 5, 6 and 9 to 10, the angle pieces 7 are divided into two halves along the longitudinal axes of their legs 10, and the wedge surfaces 8 are so arranged and the tightening pieces 12 so constructed, that upon tightening of the screws 11 they urge the angle piece halves apart.

The tightening pieces 12 are in all constructions so formed that they make up the cross section of the angle piece substantially as far as possible to the cross section of the cavity 3 of the frame member. It is indeed necessary for the rigidity of the connection that the connecting device fills up the cavity as much as possible, i.e. it must at least bear on two opposite sides of the cavity, but better even on three, or if possible on all four sides, and indeed this force should be effective not merely at individual places, as this is mostly the case, when the wedging force operates in the longitudinal direction of the strips.

This can have as a consequence a bulging of the frame section walls, or the frame has play at the parts which are not subjected to force and can rock. But the wedging force should act uniformly on the entire length of the angle piece leg. This can only be achieved when the wedging force acts transversely to the longitudinal axis of the strips.

In the constructions according to FIGS. 3 to 8 the respective tightening piece 12 is made angular and thus extends over both legs of the frame corner. This makes possible a smaller number of individual parts, and thus simplifies storage and assembly.

According to FIGS. 1, 2 and 9 to 11, a separate tightening piece is associated with each angle piece leg. The construction according to FIGS. 1 and 2 is a modification of FIGS. 3 and 4 and may be advantageous in certain circumstances.

According to FIGS. 9 to 11 the angle piece 7 which is divided in two halves in the longitudinal direction is advantageously made from plastics material. This enables an economical manufacture. Each leg 6 has a deep recess 14, opening towards the interior of the frame, for the tightening piece 12. The side walls of this recess 14 extending in the longitudinal direction of the angle piece leg 6, form the wedge surfaces 8 which diverge towards the open side of the recess. The tightening piece 12 is a small plate, of appropriate thickness, preferably of metal, which corresponds in its cross sectional shape to that of the recess 14.

In order to facilitate the assembly of the parts: two angle piece halves and tightening pieces, advantageously an anchorage of angle piece and tightening piece is provided. This can be a slot-tongue connection. For this preferably there are ribs (tongues) 16 provided on the bottom 15 of the recess 14, which engage in corresponding slots 17 in the bottom of the tightening piece. Advantageously the slots and tongues are inclined relatively to the transverse axis of the leg of the angle piece, e.g. in the direction of the wedge surface lying next to the respective slot-tongue connection. In addition, the ribs 16 at their free edges can have hook-shaped bends 18 and the slots 17 corresponding undercuts 19. In this manner the assembled angle piece halves are held together by the tightening pieces inserted in the recesses 14 at least to such an extent that the device can be inserted as a whole in the ends of the sections.

Another kind of simplification of assembly with an angle piece 7 consisting of two parallel halves is shown in FIGS. 12 to 14. In the end face of each angle piece leg there is provided a groove 20 extending transversely to the plane of the window or door, which groove may be somewhat undercut. The angle piece halves are placed parallel, close to one another, at a distance corresponding to the width of the tightening piece 12, and then a short rod 21, preferably of a resilient plastics material, is driven into the grooves 20.

At the end face of each angle piece leg there is thus arranged such a plastics rod 21, and it holds the two angle piece halves together. For the tightening piece, there is provided a recess 23 in the angle piece leg, similar to that described in more detail above. In order to prevent the tightening piece falling out once it has been inserted in this recess 23, the edges of the recess are advantageously so shaped, that they extend with short flanges 22 into the opening of the recess.

In this manner the entire connecting device with the exception of the screws can be put together after the manner of a pre-assembly, before it is inserted as an integral building component into the frame corner.

With the constructions according to FIGS. 1, 2, 9 to 11, with separate tightening piece 12 for each angle piece leg 6, it is moreover conceivable to provide only one leg of the frame corner with a device according to the invention, while the other leg of the frame corner is connected with the associated angle piece leg, e.g. by direct screwing or rivetting.

In order now to bring the wedging function into operation, the screws 11 are inserted in correspondingly prepared bores, that is to say transverse to the longitudinal axis of the sections. This screws engage, in the examples according to FIGS. 1 to 4, in threads in the angle piece legs, and in FIGS. 5 to 14 in the tightening pieces. When the screws are tightened, they pull the parts provided with threads against the corresponding transverse web of the frame section. At the same time the angle piece and tightening piece with their abutting wedge surfaces press against the walls of the strip cavity 3, and in fact force is exerted on at least three sides of the cavity. At the same time by the screwing action there results also a tension in the direction towards the frame corner, and thus the mitred ends of the sections are pressed together, so that a tight joint is achieved. This tension in the direction of the corner joint is indicated in FIG. 8 by the two different positions of the tightening piece 12, by way of an example, in which the first, namely the starting position, is given by the position of the tightening piece shown with chain outline, and the end position by the position of the tightening piece shown with full lines and cross hatching.

The insertion of the screws transverse to the longitudinal direction of the sections brings in addition the advantage, that the connection between the device and the sections does not depend on the frictional resistance of the wedge parts only, but that a relative movement between the device and the sections in the direction of the longitudinal axis, e.g. upon possible ceasing of the wedging action, is blocked by the screws and rendered impossible.

What we claim is:

1. A releasable corner connection device for frame sections having cavities defined therein, said sections meeting at an angle and being mitred at their ends, comprising an angle piece having two legs each engaging the cavity of a section, and at least one tightening piece and one screw having a head for each section, said tightening piece and said section being provided with bores generally algined and transverse to the longitudinal axis of the tightening piece and section, said bore in said tightening piece being threaded, said angle piece and said tightening piece having cooperating wedge surfaces and being so constructed and arranged with said screw that turning of said screw in said threaded bore will cause said tightening piece to move in a direction transverse to said axis producing at least binding engagement between said angle piece and said section thereby joining the section, angle piece and tightening piece by wedging action whereby the wedge surfaces of both said angle piece and said tightening piece extend parallel to said longitudinal axis and make an acute angle with the direction of the bore, and said screw is threadable in said direction in said bore and bearing with the head of said screw upon said section.

2. Releasable corner connection device according to claim 1, wherein the angle piece and tightening piece each have two wedging surfaces directed parallel to one another and arranged step-wise.

3. Releasable corner connection device according to claim 2, wherein associated with each of said angle piece legs there is a separate tightening piece, which complements the cross section of the angle piece substantially to the cross section of the cavity.

4. Releasable corner connection device according to claim 2, wherein the device has only one, angle shaped, tightening piece, which complements the angle piece substantially to the cross section of the strip cavity.

5. Releasable corner connection device according to claim 1, wherein the angle piece is divided longitudinally in the direction of the plane defined by the frame and each half has a wedging surface, said wedging surfaces being inclined to each other.

6. Releasable corner connection device according to claim 5, wherein the tightening piece is made angle shaped and inserted between the halves of the angle piece.

7. Releasable corner connection device according to claim 5, wherein the two halves of the angle piece are held together by short rods of resilient material, which are pressed into slots defined in the free end surfaces of the angle piece halves, extending transverse to the plane of the frame.

8. Releasable corner connection device according to claim 1, wherein the angle piece has a groove defined therein which groove is open in the direction of the plane of the frame, the side walls of said groove form the wedge surfaces diverging from one another towards an opening in said groove said opening being adapted for receiving said tightening piece.

9. Releasable corner connection device according to claim 8, wherein the bottom of the groove is convex towards the interior of the groove and the convexity of the bottom of the groove is decreased on tightening of the tightening piece.

10. Releasable corner connection device according to claim 9, wherein short flanges are arranged, directed towards one another, at the free edges of the groove, said flanges being adapted to retain the tightening piece within said groove when placed therein.

11. Releasable corner connection device according to claim 5, wherein associated with each angle piece leg there is a tightening piece preferably in the form of a plate, in which at least two opposite sides form the wedge surfaces inclined to one another.

12. Releasable corner connection device according to claim 11, wherein the tightening piece lies in a correspondingly shaped recess defined in the associated angle piece leg.

13. Releasable corner connection device according to claim 12, wherein the recess is closed towards the free end of the angle piece leg.

14. Releasable corner connection device according to claim 13, wherein the tightening piece has at least one slot defined therein and the angle piece has at least one rib portion extending into the recess whereby the tightening piece is anchored to the angle piece at the surface lying in the recess of the angle piece leg by means of the slot and tongue engagement.

15. Releasable corner connection device according to claim 14, wherein the slot and tongue are additionally formed as a hooked connection.

16. Releasable corner connection device according to claim 14, wherein the slot and tongue are arranged in cross section parallel to the respective closest wedge surface.

17. Releasable corner connection device according to claim 1, wherein the screws are inserted in the direction parallel to the frame.

18. Releasable corner connection device according to claim 1, wherein only one angle piece leg is connected with the section with the help of tightening piece, while the second section is directly and fixedly connected with the angle piece leg associated with it.

* * * * *